United States Patent [19]

Hara

[11] Patent Number: 4,685,530

[45] Date of Patent: Aug. 11, 1987

[54] SIDE COVER STRUCTURE FOR MOTORCYCLES

[75] Inventor: Kunitaka Hara, Saitama, Japan

[73] Assignee: Honda Giken Kogyo Kabushiki Kaisha, Tokyo, Japan

[21] Appl. No.: 775,961

[22] Filed: Sep. 13, 1985

[30] Foreign Application Priority Data

Sep. 14, 1984 [JP] Japan .................. 59-139753[U]

[51] Int. Cl.[4] ....................... B60K 11/08; B62J 17/00
[52] U.S. Cl. ..................... 180/219; 55/276;
55/385 B; 123/41.27; 123/41.57; 180/68.4;
180/68.5; 180/225; 180/229; 280/289 S;
296/78.1; D12/110
[58] Field of Search .............. 180/219, 225, 229, 68.4,
180/68.5; 280/289 S, 289 R, 289 A, 281 R;
D12/110; 55/385 B, 276; 123/41.27, 41.57;
296/78.1, 145; 160/DIG. 1, DIG. 2, DIG. 4,
DIG. 7, DIG. 8, DIG. 10

[56] References Cited

U.S. PATENT DOCUMENTS

| | | | |
|---|---|---|---|
| 1,614,010 | 1/1927 | Martinov | 296/145 |
| 4,440,255 | 4/1984 | Shinozaki | 180/225 |
| 4,445,585 | 5/1984 | Imani | 180/219 X |
| 4,479,676 | 10/1984 | Hayes | 296/78.1 |
| 4,519,473 | 8/1985 | Ochiai et al. | 180/229 |
| 4,570,740 | 2/1986 | Hara | 180/229 |

FOREIGN PATENT DOCUMENTS

| | | | |
|---|---|---|---|
| 3133854 | 4/1982 | Fed. Rep. of Germany | 180/219 |
| 3204664 | 8/1983 | Fed. Rep. of Germany | 296/78.1 |

*Primary Examiner*—John J. Love
*Assistant Examiner*—Mitchell J. Hill
*Attorney, Agent, or Firm*—Armstrong, Nikaido, Marmelstein & Kubovcik

[57] ABSTRACT

A side cover structure used in a motorcycle having a motorcycle frame, a fuel tank supported on the motorcycle frame, a driver's seat disposed on the motorcycle frame, and an engine supported on the motorcycle frame below the fuel tank and the driver's seat. The side cover structure includes a side cover member attached laterally to the motorcycle frame below the fuel tank and the driver's seat, the side cover member having at least one opening for permitting air to flow therethrough. With this arrangement, the space defined by the side cover member is effectively ventilated to protect a battery, a reservoir tank for a cooling liquid, and other motorcycle elements or components which may be disposed in the space from being affected by the heat produced by the engine. The side cover member allows the battery and the reservoir tank to be visually checked for liquid levels through the opening.

6 Claims, 7 Drawing Figures

1

SIDE COVER STRUCTURE FOR MOTORCYCLES

BACKGROUND OF THE INVENTION

The present invention relates to a side cover structure for use on a motorcycle.

One of the most popular designs of conventional motorcycles is composed of a motorcycle frame, a fuel tank disposed on the motorcycle frame, a driver's seat mounted on the motorcycle frame, and an engine supported on the motorcycle frame below the fuel tank and the driver's seat. In this motorcycle design, a battery, a reservoir tank for a cooling liquid of an engine cooling system, and other motorcycle elements or components are normally positioned in the space below the fuel tank and the driver's seat and behind the engine, and are laterally covered with a side cover.

It would be preferable for the side cover to fully cover the foregoing motorcycle elements for the purpose of protecting them completely. However, such a side cover arrangement would be disadvantageous in that the heat emitted from the engine positioned near the side cover tends to increase the temperature in the space surrounded by the side cover. If the battery and the reservoir tank were covered with the side cover, the side cover would have to be detached at the time of checking the battery and the reservoir tank for liquid levels.

SUMMARY OF THE INVENTION

The present invention has been achieved in an effort to solve the aforesaid drawbacks of the covnentional side cover structure.

It is therefore an object of the present invention to provide a side cover structure for use on a motorcycle which can efficiently discharge the heat from the space surrounded by the side cover, allows motorcycle elements or components in the space to be visually checked, and is capable of sufficiently protecting the motorcycle elements in the space.

According to the present invention, there is provided a side cover structure used in a motorcycle having a motorcycle frame, a fuel tank supported on the motorcycle frame, a driver's seat disposed on the motorcycle frame, and an engine supported on the motorcycle frame below the fuel tank and the driver's seat. The side cover structure includes a side cover member attached laterally to the motorcycle frame below the fuel tank and the driver's seat, the side cover member having at least one opening for permitting air to flow therethrough. With this arrangement, the space defined by the side cover member is effectively ventilated to protect a battery, a reservoir tank for a cooling liquid, and other motorcycle elements or components which may be disposed in the space from being affected by the heat produced by the engine. The side cover member allows the battery and the reservoir tank to be visually checked for liquid levels through the opening.

In a preferred embodiment of the present invention, the side cover member is composed of a frame defining the opening and a net disposed over the opening. The side cover structure is combined with a front cowl for effectively ventilating the space defined by the side cover member.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
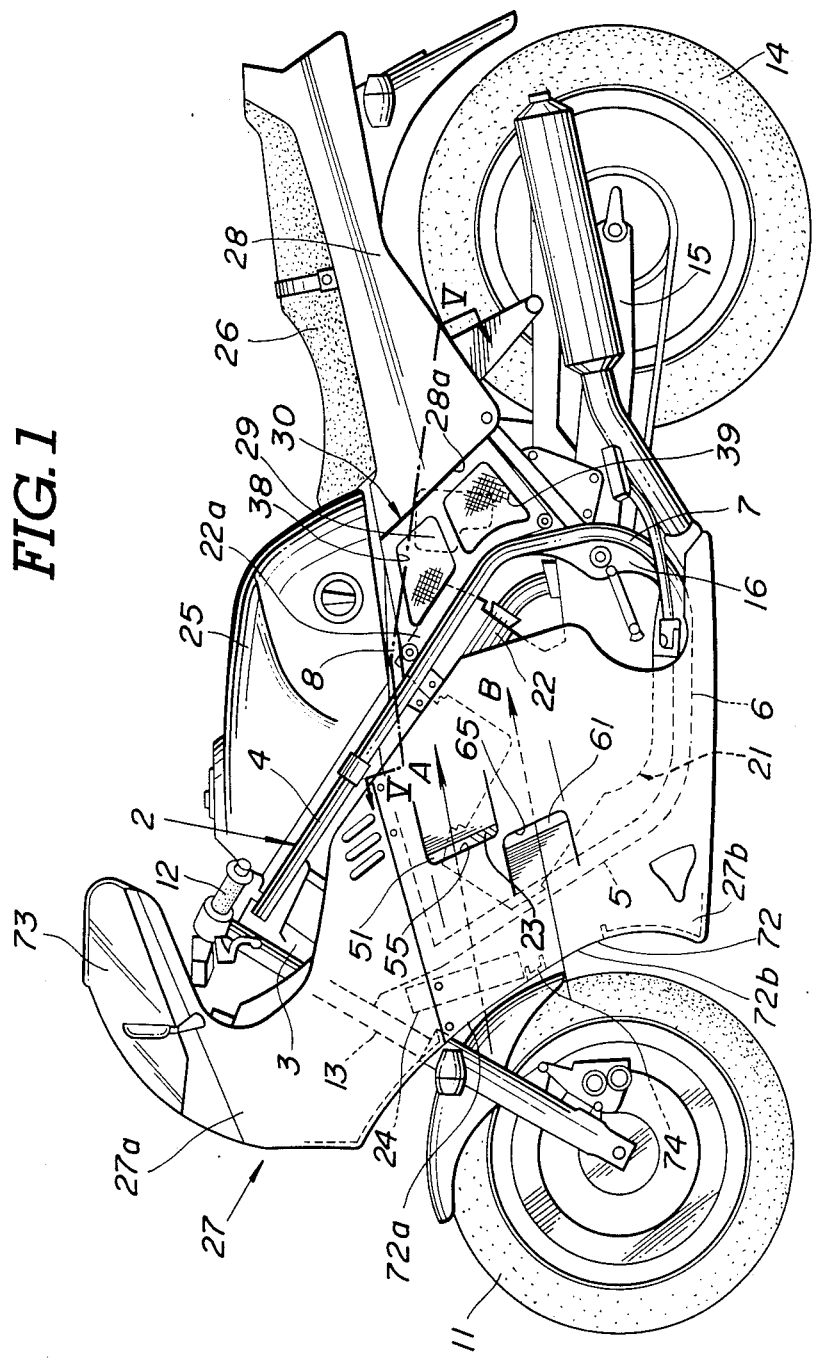
FIG. 1 is a motorcycle incorporating a side cover structure according to a preferred embodiment of the present invention.

As shown in FIG. 1, a motorcycle has a motorcycle frame 2 composed of a head pipe 3, a pair of laterally spaced main pipes 4, a down pipe 5, a down pipe lower member 6, a central pipe 7, a seat pipe 8, and a rear pipe 9. The seat pipe 8 extends rearwardly from intermediate portions of the main pipes 4. The rear pipe 9 extends between an intermediate portion of the central pipe 7 and a rear portion of the seat pipe 8. A front fork 13 supporting a front wheel 11 and steerable by a handle 12 is steerably supported on the head pipe 3. A rear fork 15 supporting a rear drive wheel 14 is angularly movably supported on a bracket 16 projecting forwardly from the central pipe 7. A rear cushioning unit 33 (FIG. 5) is coupled between the motorcycle frame 2 and the rear fork 15.

A liquid-cooled engine 21 which is V-shaped in side elevation is supported on the motorcycle frame 2 and disposed in a space below the main pipe 4, the engine 21 having two front cylinders 23 and a single rear cylinder 22. The rear cylinder 22 has a cylinder head 22a extending upwardly of rear portions of the main pipes 4. The engine 21 is cooled by a liquid-cooling system including a radiator 24 positioned in front of an upper portion of the down pipe 5. A fuel tank 25 is disposed on the main pipes 4 in front of the seat pipe 8. A driver's seat 26 is supported on the seat pipe 8 behind the fuel tank 25.

A front cowl 27 is mounted on the motorcycle frame 2 in covering relation to the front portion of the motorcycle frame 2, the engine 21, the radiator 24, and the portion of the handle 12 which is attached to the head pipe 3. A seat cowl 28 is mounted laterally and downwardly of the driver's seat 26 and has a front edge 28a inclined forwardly and upwardly. A side cover member 30 is attached to each side area of the motorcycle which is surrounded by the front edge 28a, rear portions of the main pipes 4, an upper portion of the central pipe 7, the seat pipe 8, and a front portion of the rear pipe 9.

Figure 3:
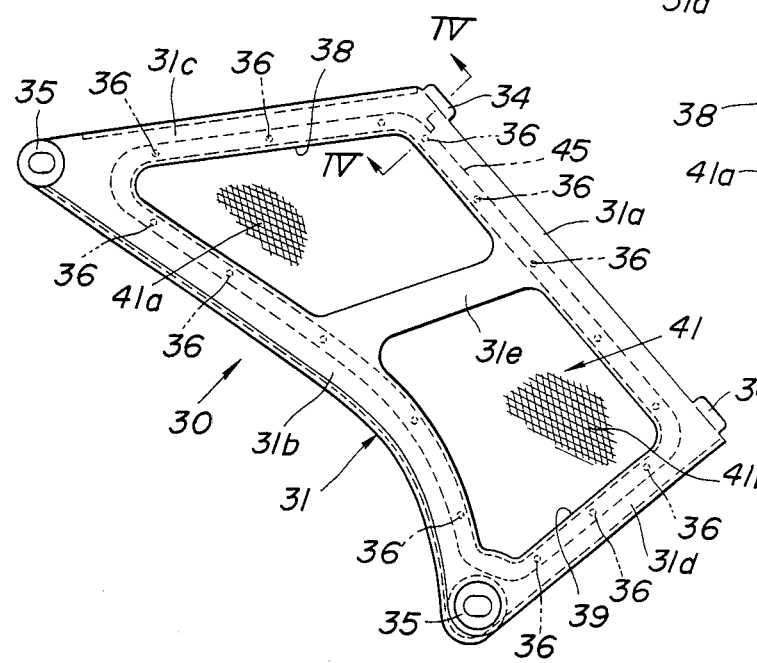
FIG. 3 is a side elevational view of a side cover member in the side cover structure of the present invention.

As illustrated in FIG. 3, the side cover member 30 comprises a frame 31 defining upper and lower openings 38, 39, and a net 41 attached to the inner side of the frame 31 in covering relation to the openings 38, 39.

The frame 31 has an outer peripheral body including a rear member 31a lying in alignment with the front edge 28a of the seat cowl 28, a front member 31b lying complementarily to the front surface a bent pipe portion extending from the rear portion of the main pipe 4 toward the upper portion of the central pipe 7, an upper member 31 c extending in alignment with the lower surface of the front portion of the seat pipe 8, and a lower member 31d extending in alignment with the upper surface of the front portion of the rear pipe 9. The frame 31 also has a reinforcing member 31e interconnecting intermediate portions of the rear and front members 31a, 31b, with the openings 38, 39 being defined upwardly and downwardly of the reinforcing member 31e. The frame 31 is in the form of a substantially flat plate made of synthetic resin. Engagement pieces or tongues 34 project rearwardly from the upper and lower ends of the rear member 31a for engagement with the inner surface of the seat cowl front edge 28a. The front member 31b has attachment holes defined in the upper end lower corners thereof, and grommets 35 are mounted in the respective attachment holes. Fitting pins 36 projects at suitable spaced intervals front the inner surfaces of the frame members 31a, 31b, 31c, 31d surrounding the openings 38, 39.

Figure 4:
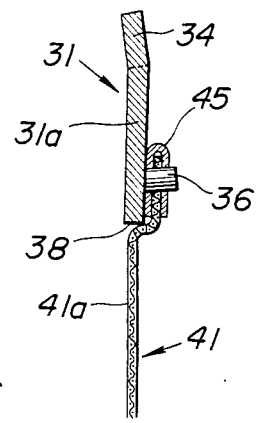
FIG. 4 is an enlarged cross-sectional view taken along line IV—IV of FIG. 3.

The net 41 comprises a single unitary colored metal net covering the openings 38, 39. As shown in FIGS. 3 and 4, a retainer 45 is fitted over the outer edge of the net 41 and has holes defined therein at the same spaced intervals as those of the fitting pins 36. The net 41 is attached to the frame 31 by fitting the fitting pins 36 into the respective holes in the retainer 45. The net 41 has portions 41a, 41b projecting outwardly into the openings 38, 39 so that the outer surface of the net 41 lies substantially flush with the outer surface of the frame 31.

The side cover member 30 is mounted on each side of the motorcycle frame in contiguous relation to the fuel tank 25 by inserting the engagement tongues 34 of the side cover member 30 behind the seat cown front edge 28a in engagement therewith, and fitting the grommets 35 over pins (not shown) on the motorcycle frame 2.

Figure 5:
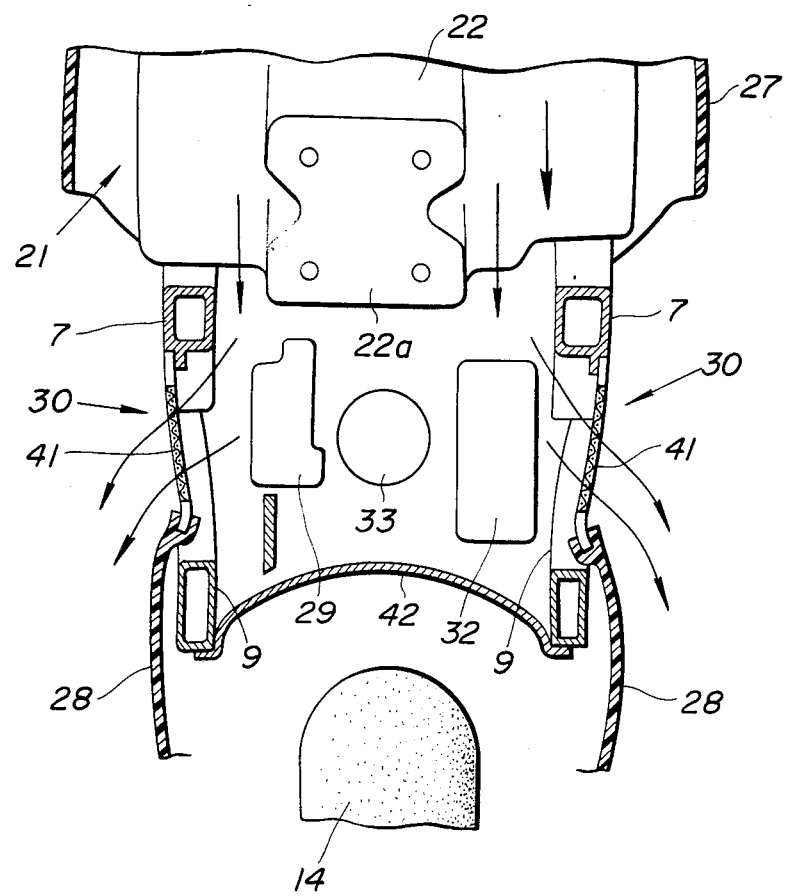
FIG. 5 is a fragmentary sectional plan view of the motorcycle in the vicinity of the side cover member taken along line V—V of FIG. 1.

A shown in FIG. 5, a reservoir tank 29 for a cooling liquid of the engine cooling system is supported on the motorcycle frame and disposed in a lefthand position within the space defined between the side cover member 30. A battery 32 is supported on the motorcycle frame and positioned in a righthand position within the same space. The rear cushioning unit 33 is disposed between the battery 32 and the reservoir tank 29. The front portion of a rear fender 42 is disposed behind the reservoir tank 29, the battery 32, and the rear cushioning unit 33.

Since the side cover member 30 has the openings 38, 39 covered with the net 41, the heat generated by the cylinder head 22a of the rear cylinder 22 while the engine 21 is in operation can be discharged out through the openings 38, 39 and the net 41.

The reservoir tank 29 and the battery 32 can be visually checked through the net 41. Therefore, the levels of the cooling liquid and the battery solution can easily be checked with the side cover member 30 mounted in position. The reservoir tank 29 and the battery 32 can also be protected by the net 41.

Inasmuch as the outer surface of the net 41 and the outer surface of the frame 31 lie substantially flush with each other, the driver does not feel uncomfortable when his legs touch the side covers 30.

Figure 2:
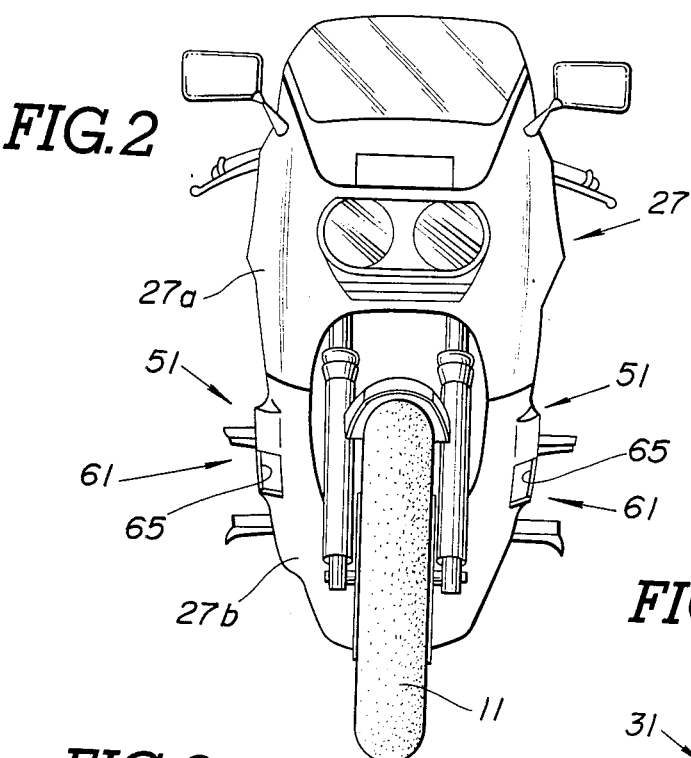
FIG. 2 is a front elevational view of the motorcycle shown in FIG. 1.

The front cowl 27 will be described in greater detail with reference to FIGS. 1 and 2.

The front cowl 27 has a front opening 72 and a windshield 73.

The front cowl 27 is composed of an upper cowl member 27a and a lower cowl member 27b which are coupled to each other. A horizontally extending stay bar 74 extends across the front opening 72 in the vicinity of a vertical central position thereof to divide the opening 72 into an upper opening portion 72a in front of the radiator 24 and a lower opening portion 72b in front of the front cylinders 23 of the engine 21.

The lower cowl member 27b has in each side thereof a first lateral opening 51 defined by a duct having a rectangular cross section for guiding air out of the space in the front cowl 27. The first lateral opening 51 is positioned on a hypothetical rearward extension from the radiator 24 as seen in side elevation. The lower cowl member 27b also has in each side thereof a second lateral opening 61 defined by a duct having a rectangular cross section for introducing ambient air into the space in the front cowl 27. The second lateral opening 61 is positioned substantially laterally of the front cylinders 23 and below the first lateral opening 51. The first and second lateral openings 51, 61 are inclined such that their rear portions are slightly higher than the front portions thereof.

Figure 6:
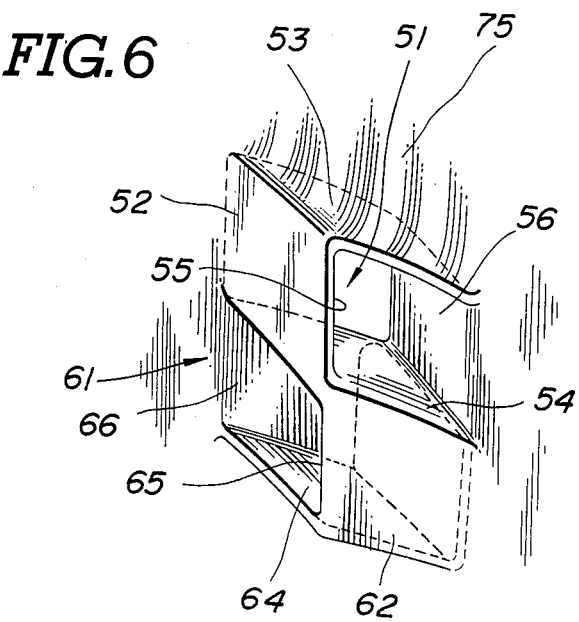
FIG. 6 is a perspective view of side openings in a front cowl in the side cover structure of the invention.
Figure 7:
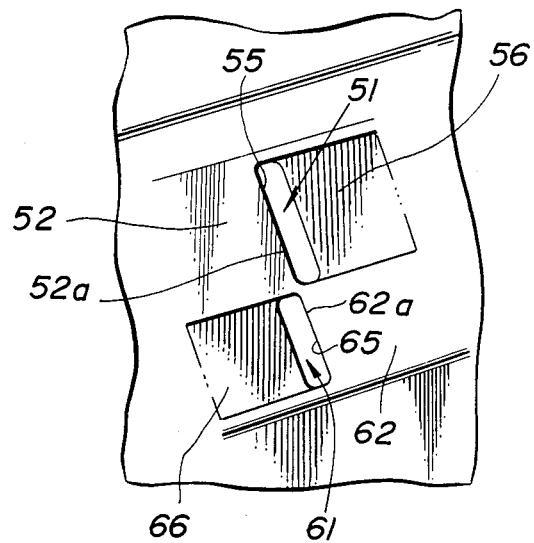
FIG. 7 is a side elevational view of the side openings shown in FIG. 6.

As illustrated in FIGS. 6 and 7, the duct defining the first lateral opening 51 has an outer side wall 52 progressively projecting laterally outwardly from a cowl side surface 75 in the rearward direction, and top and bottom walls 53, 54 connecting the upper and lower edges of the outer side wall 52 to the cowl side surface 75. The rear edge of the outer side wall 52 and the rear edges of the top and bottom walls 53, 54 jointly constitute a duct edge portion 55 which opens in the substantially rearward direction of the motorcycle. The duct defining the first lateral opening 51 also includes an inner side wall 56 having an inclined surface extending rearwardly from a position located laterally inwardly of the cowl side surface 75 and slanted progressively laterally outwardly in the rearward direction, the inner side wall 56 blending into the cowl side surface 75.

The duct defining the second lateral opening 61 is composed of an outer side wall 62 progressively projecting laterally outwardly from the cowl side surface 75 in the forward direction, and the top wall 54 (which is the same as the bottom wall of the duct defining the first lateral opening 51) also progressively projecting laterally outwardly from the cowl side surface and a bottom wall 64 connecting the upper and lower edges of the outer side wall 62 to the cowl side surface 75. The front edge of the outer side wall 62 and the edges of the top and bottom walls 54, 64 jointly constitute a duct edge portion 65 which opens in the substantially forward direction of the motorcycle. The outer side wall 52 has a rear edge 52a and the outer side wall 62 has a front edge 62a, the rear and front edges 52a, 62a being substantially aligned with each other when seen in side elevation. The duct defining the second lateral opening 61 also includes a inner side wall 66 having an inclined surface extending forwardly from a position located laterally inwardly of the cowl side surface 75 and slanted progressively laterally outwardly in the forward direction, the inner side wall 66 blending into the cowl side surface 75. The bottom wall 54 of the duct defining the first lateral opening 51, or the top wall 54 of the duct defining the second lateral opening 61, comprises a partition which is in the shape of a lozenge when seen in plan.

As the motorcycle runs, air enters through the upper opening portion 72a into the front cowl 27 in the direction of the arrow A (FIG. 1), passes through the radiator 24 to cool the same, and then is discharged through the first lateral opening 51 laterally out of the front cowl 27.

Air is also introduced through the second lateral opening 61 into the front cowl 27 in the direction of the arrow B (FIG. 1). The air thus introduced flows past the rear engine cylinder 22 in the directions of the arrows (FIG. 5). Part of the air flows into the space between the side cover members 30, and is thereafter discharged laterally out of the side cover members 30 through the upper and lower openings 38, 39. Therefore, the space in the front cowl 27 and the space between the side cover members 30 can effectively be ventilated. Since the axis (indicated by the arrow B in FIG. 1) of the duct defining the second lateral opening 61 is directed toward the side cover member 30 when seen side elevation, the space between the side cover members 30 can more effectively be ventilated.

As the lateral openings 51, 61 in the front cowl 27 project laterally, the front cowl 27 has a desired degree of mechanical strength at the edges of these lateral openings 51, 61.

Although there has been described what is at present considered to be the preferred embodiment of the present invention, it will be understood that the invention may be embodied in other specific forms without departing from the spirit or essential characteristics thereof. The present embodiment is therefore to be consdered in all aspects as illustrative, and not restrictive. The scope of the invention is indicated by the appended claims rather than by the foregoing description.

I claim:

1. A side cover and cowl structure in a motorcycle having a motorcycle frame having a head pipe, laterally spaced side pipes, a seat pipe and a rear pipe, an engine having cylinders, said engine and said cylinders being disposed between said spaced side pipes, a fuel tank supported on said frame, a driver's seat disposed on said frame, said engine being supported on said frame below said fuel tank and said driver's seat, a battery and an engine-cooling system associated with said engine, said engine-cooling system including a radiator and a reservoir tank for a cooling liquid, said battery and said reservoir tank being supported on said frame below said driver's seat and behind said engine, said side cover and cowl structure comprising:

side cover members attached to said frame over said laterally spaced side pipes and under side driver's seat;

said side cover members partially covering the sides of said cylinder and having an opening for permitting air to flow therethrough;

said side covers members covering opposite sides of said battery and said reservoir tank, whereby said battery and said reservoir tank can be checked through said openings in said side cover members.

2. A side cover and cowl structure according to claim 1, wherein said side cover members each comprises a frame defining said opening and a net disposed over said opening.

3. A side cover and cowl structure according to claim 1, wherein said side cover members each has a front cowl portion supported on said frame in covering relation to a front portion of said frame, said front cowl portion having in a side wall thereof a first lateral opening for guiding air out of said front cowl portion when said motorcycle is running and a second lateral opening for introducing air into said front cowl portion when said motorcycle is running, said first and second lateral openings being arranged in substantially vertical alignment with each other, said front cowl portion being disposed at the front of said side cover members.

4. A side cover and cowl structure in a motorcycle having a motorcycle frame having a head pipe, laterally spaced side pipes, a seat pipe and a rear pipe, an engine having cylinders, said engine and said cylinders being disposed between said spaced side pipes, a fuel tank supported on said frame, a driver's seat disposed on said frame, said engine being supported on said frame below said fuel tank and said driver's seat, said side cover and cowl structure comprising:

a side cover members attached to said frame over said laterally spaced side pipes and under said driver's seat;

said side cover members partially covering the sides of said cylinder and having an opening for permitting air to flow therethrough;

said side cover members each having a front cowl portion supported on said frame in covering relation to a front portion of said frame, said front cowl portion having in a side wall thereof a first lateral opening for guiding air out of said front cowl portion when said motorcycle is running and a second lateral opening for introducing air into said front cowl portion when said motorcycle is running, said first and second lateral openings being arranged in substantially vertical alignment with each other, said front cowl portion being disposed at the front of said side cover members;

each of said first and second lateral openings in said front cowl being defined by a duct having a rectangular cross section, said front cowl having a partition doubling as the bottom wall of the duct defining one of the lateral openings and the top wall of the duct defining the other lateral opening.

5. A side cover structure according to claim 4, wherein the duct defining said second lateral opening has an axis directed substantially toward said side cover member when seen in side elevation.

6. A side cover structure according to claim 4, wherein the duct defining each of said lateral openings has a side wall projecting laterally outwardly of said side wall of the front cowl.

* * * * *